United States Patent [19]

Taguchi et al.

[11] Patent Number: 5,349,419
[45] Date of Patent: Sep. 20, 1994

[54] METHOD AND APPARATUS FOR RECORDING STEREOSCOPIC IMAGES

[75] Inventors: Seiichi Taguchi, Kanagawa; Shunkichi Igarashi, Tokyo, both of Japan

[73] Assignee: Fuji Photo Film Co., Ltd., Kanagawa, Japan

[21] Appl. No.: 46,838

[22] Filed: Apr. 14, 1993

[30] Foreign Application Priority Data

Apr. 15, 1992 [JP] Japan ................... 4-95439

[51] Int. Cl.$^5$ .................. G03B 27/32; G03B 35/14
[52] U.S. Cl. ........................ 355/22; 348/59; 359/463
[58] Field of Search ................ 355/22; 358/88

[56] References Cited

U.S. PATENT DOCUMENTS

| | | | |
|---|---|---|---|
| 3,960,563 | 6/1976 | Lo et al. | 96/40 |
| 4,037,950 | 7/1977 | Lo et al. | 252/58 |
| 4,063,265 | 12/1977 | Lo et al. | 354/294 |
| 4,120,562 | 10/1978 | Lo et al. | 350/130 |

FOREIGN PATENT DOCUMENTS 63-196349 11/1989 Japan .

*Primary Examiner*—Richard A. Wintercorn
*Attorney, Agent, or Firm*—Sughrue, Mion, Zinn, Macpeak & Seas

[57] ABSTRACT

The improved method and apparatus for recording a stereoscopic image calculate the linear image recording positions for each lenticular lens in connection with all of the linear images of the nth original image in such a way that all of the linear images of the nth original image that are to be recorded in association with the respective lenticular lenses will fall within the same area at the intended viewing position, and record the linear images by an image forming means on the basis of the results of said calculation. Therefore, according to the present invention, stereoscopic images of high quality can be recorded using the lenticular sheet without causing any serious defects such as multiple image or image flickering.

6 Claims, 11 Drawing Sheets

METHOD AND APPARATUS FOR RECORDING STEREOSCOPIC IMAGES

BACKGROUND OF THE INVENTION

The present invention relates to a novel method and apparatus that are capable of recording flickerless stereoscopic images of high quality using a lenticular sheet and which yet have flexibility in adaptation, as required, for the performance of various image processing operations such as enlargement and reduction, as well as for alterations in the specifications of the lenticular sheet and in the number of original images to be reproduced.

A typical method of recording stereoscopic images using a lenticular sheet is shown in FIG. 13. The lenticular sheet indicated by C has a recording layer D on the back side to construct a lenticular recording material F. Original images $A_1$ and $A_2$ coming from different viewpoints (one from the right and the other from the left) are projected onto projection lenses $B_1$ and $B_2$; the projected original images are then separated into linear images by means of the lenticular sheet C and recorded as $E_1$, $E_2$, etc.

As shown in FIG. 14, the images $E_1$ and $E_2$ recorded on the recording layer D are viewed through the lenticular sheet C of the lenticular recording material F by means of the right and left eyes R and L. This twin-lens system provides a stereoscopic vision of the original images $A_1$ and $A_2$.

Conventionally, the recording of linear images on a lenticular recording material has been accomplished with a stereoscopic image recording apparatus (hereunder referred to simply as "a recording apparatus") that relies upon optical exposure (printing). With this recording apparatus, original images which are transmission images are projected from a light source such as a halogen lamp and, as shown in FIG. 13, the light transmitted through the original images passes through the projection lenses to be focused on the lenticular recording material via the lenticular sheet, whereby the original images are exposed as linear images. Japanese Patent Publication (kokoku) Nos. 5473/1967, 6488/1973, 607/1974 and 33847/1978 disclose recording apparatuses with which two original images are projected for printing on a lenticular recording material.

It is also known that stereoscopic images of high quality can be produced by increasing the number of original images. On the basis of this concept, Japanese Patent Publication (kokoku) No. 7981/1983 proposed a recording apparatus with which a number of original images are exposed sequentially on a lenticular recording material, and Japanese Patent Publication (kokoku) No. 31578/1981 proposed a recording apparatus, in which a number of original images are projected en masse onto a field lens and are then passed through projection lenses that are associated with the respective original images, whereby those original images are recorded on a lenticular recording material at the corresponding print angles.

With the aforementioned apparatus for recording stereoscopic images by an optical method, it is necessary to expose a plurality of original images by projecting them onto a lenticular recording material and, hence, the optics for projecting the original images onto the lenticular recording material will unavoidably become complex in construction and, in addition, it has only a low degree of freedom in design. Furthermore, the efforts for adaptation to changes in the recording conditions such as alterations in magnification (enlargement and reduction of the size of image to be recorded) are subject to optical or mechanical limitations.

If the viewing distance is changed, it becomes necessary to alter the specifications for the lenticular sheet, such as the pitch of lenticular lenses formed on the sheet. However, effecting such alterations is not easy since it is also necessary to make optical and mechanical alterations in the projecting conditions (system layout) such as the projecting and exposing (printing) angle. Similarly, it is also difficult to meet the requirement for changing the size of image to be recorded.

In contrast, image recording by scanning exposure requires comparatively simple optics and yet it has great flexibility in adapting to various image processing operations and to alterations in the specifications of the lenticular sheet. To take advantage of these features, various apparatus and methods have been proposed for recording image by scanning exposure.

For example, Japanese Patent Publication (kokoku) No. 3781/1984 teaches a stereoscopic image recording system in which a plurality of original images are taken with a TV camera, processed and stored in frame memories, from which the stored image signals are retrieved sequentially as (linear) images in accordance with the pitch of lenticular lenses used and, after the linear images are recorded on a recording material by scanning exposure, the lenticular sheet is bonded to the recording material.

Japanese Patent Application (kokai) NO. 295296/1989 teaches a method of preparing a stereoscopic variable pixel forming sheet, in which data for coordinates in a solid space that have been obtained from a plurality of original images carrying inherent continuous parallax information or time differential information are split into linear images that are assigned to zones corresponding to the lenticular lenses on a lenticular sheet and the formed pixels for stereoscopic image are aligned in reverse order with respect to the parallax or time differential information and recorded on a recording material, followed by bonding the lenticular sheet onto the recording material.

In the apparatus for recording stereoscopic images by scanning exposure, each original image is split into linear images on the basis of the image information carried by the plurality of original images and, after the linear images are recorded on the recording material, it must be bonded to the lenticular sheet in registry to assure that the interval of recording the linear images is in exact agreement with the pitch (P) of lenticular lenses on the lenticular sheet.

The use of a lenticular sheet in the recording of stereoscopic images has suffered from various problems such as the formation of "multiple image" (not a desired single image but two or more duplicate images are formed as offset from each other) and the flickering of the formed image. The multiple duplication of a stereoscopic image or its flickering not only tires the eyes of the viewer but also gives him great discomfort, thereby damaging the commercial value of the formed stereoscopic image.

The multiple duplication of a stereoscopic image and its flickering are caused when an unwanted linear image (of a particular original image) is viewed by the right and left eyes or when the areas where no image is recorded falls within the visual field. However, these problems have not been completely solved in the prior art of recording stereoscopic images using a lenticular sheet and, hence, there is a great need for developing a method and apparatus that are capable of reproducing stereoscopic images of a higher quality.

BRIEF SUMMARY OF THE INVENTION

The present invention has been accomplished under these prior art circumstances and has as an object providing a method and apparatus that are capable of recording stereoscopic images of high quality without causing any serious defects such as multiple image or image flickering.

The above-described object of the present invention can be attained in accordance with its first aspect which provides a method for recording stereoscopic images, by which linear images as produced from a plurality of original images from different viewpoints are recorded using a lenticular sheet comprising a sequence of lenticular lenses by an image forming means to produce a stereoscopic vision, wherein the linear image recording positions that insure that all of the linear images of the nth original image that are to be recorded in association with the respective lenticular lenses will fall within the same area at the intended viewing position are calculated for each lenticular lens in connection with all linear images of the nth original image, and the linear images are recorded by said image forming means on the basis of the results of said calculation.

The aforementioned object of the present invention can be attained in accordance with its second aspect which provides an apparatus for recording stereoscopic images, with which linear images as produced from a plurality of original images from different viewpoints are recorded to produce a stereoscopic image using a lenticular sheet comprising a sequence of lenticular lenses, comprising:

a splitting means that is supplied with information on said plurality of original images and which splits each of said original images into linear images to be recorded;

a means that determines the recording positions of linear images by calculating the recording positions of said linear images for each lenticular lens in order to insure that all of the liner images of the nth original image will fall within the same area at the intended viewing position; and an image forming means that forms said linear images in accordance with the information on the recording positions which has been obtained by said calculating means.

Preferably, the recording width of said linear images is adjusted in such a way that they are recorded, without producing any overlaps or blank portions, between the right and left ends of each of the linear image recording positions as determined by said recording position determining means.

Preferably, areas other than the linear image recording positions are painted with a black color.

Preferably, said image forming means is such that a light beam modulated in accordance with the information on linear images to be recorded is allowed to be incident on the back side of a lenticular recording material having a recording layer provided as an integral part of the back surface of the lenticular sheet, so that said recording layer is scanned two-dimensionally by means of said light beam to record linear images on said recording layer through scanning exposure.

DETAILED DESCRIPTION OF THE INVENTION

Figure 1:
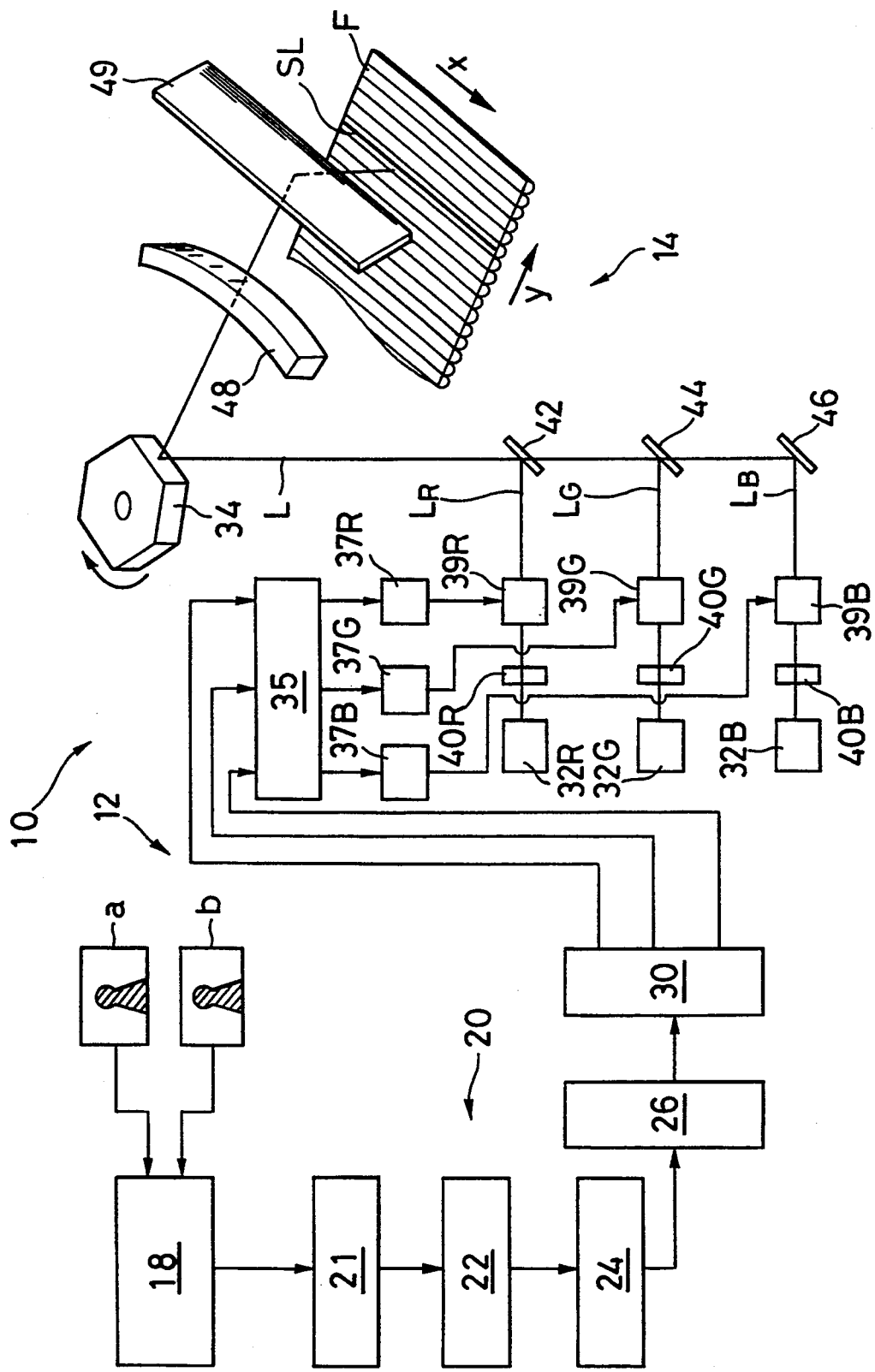
FIG. 1 is a diagram showing the concept of a stereoscopic image recording apparatus according to an embodiment of the present invention.

The present invention is described below in detail.

In the present invention, a lenticular sheet is used to form linear images from a plurality of original images and the formed linear images are recorded by an image forming means so as to produce a stereoscopic image. The positions in which the linear images are recorded are adjusted in accordance with the viewing conditions, the specifications of the lenticular sheet used and other factors, thereby enabling a stereoscopic image of high quality to be recorded without multiple image or flickering.

Two major causes of the drop in the quality of stereoscopic image that is recorded using a lenticular sheet are the formation of multiple image and image flickering and these problems occur for various reasons; for one thing, the recorded linear images are viewed outside the areas where they should theoretically be viewed in the viewing position, and for another, the necessary linear images cannot be viewed in the areas where they should theoretically be viewed in the viewing position.

The method and apparatus of the present invention for recording stereoscopic images have been developed with a view to solving the aforementioned problems of image flickering and multiple image. In accordance with the invention, the positions in which the linear images of original images to be viewed through a lenticular sheet are to be recorded are calculated for each lenticular lens in such a way that those linear images fall within the same area for each original image in an intended viewing position, and the recording positions of the linear images are determined on the basis of the calculated values.

When recording a stereoscopic image using a lenticular sheet, linear images into which each original image has been split are recorded in association with the pitch of lenticular lenses on the lenticular sheet.

Within a pitch of lenticular lenses, the linear images are sequenced in accordance with the parallax order of the original images. The present invention does more than that; not only the sequencing of linear images in accordance with the parallax order of original images but also the recording positions of all linear images of the original images such that they will fall within the same areas in the intended viewing position are computed for each lenticular lens in accordance with the specifications of lenticular lenses such as their pitch, radius of curvature and thickness, the viewing distance, the position of the lenticular lens associated with a particular linear image, and the positions at which the linear images are to be recorded in each lenticular lens are determined on the basis of the results of that computation.

Hence, in accordance with the present invention, unwanted linear images will not be viewed by the right and/or left eye at the intended viewing position and this enables a stereoscopic image of high quality to be recorded without causing image flickering or producing multiple image.

On the pages that follow, the method of recording a stereoscopic image according to the first aspect of the present invention and the apparatus for recording a stereoscopic image according to the second aspect are described in detail with reference to the preferred embodiments shown in accompanying drawings.

FIG. 1 shows conceptually an apparatus for recording a stereoscopic image according to an embodiment of the present invention. The apparatus for recording a stereoscopic image (hereunder referred to simply as the "recording apparatus") which is indicated by 10 in FIG. 1 reads a plurality of original images as obtained from different viewpoints by an imaging device such as a multi-lens camera and records a stereoscopic image on a lenticular recording material F. In a preferred embodiment, the lenticular recording material F has a recording layer D formed as an integral part of the rear surface of a lenticular sheet C and the apparatus records the stereoscopic image on the lenticular recording material F by scan exposure from the rear side (see FIG. 3). The following description assumes that two original images a and b are read for recording a stereoscopic image but, needless to say, the present invention is by no means limited to this particular case.

Figure 3:
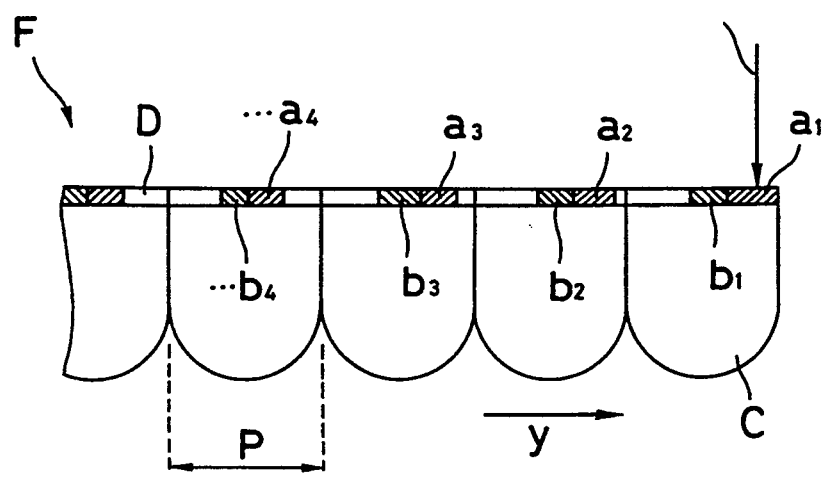
FIG. 3 is a diagram showing conceptually how linear images are recorded on a lenticular recording material with the stereoscopic image recording apparatus shown in FIG. 1;]
Figure 4:
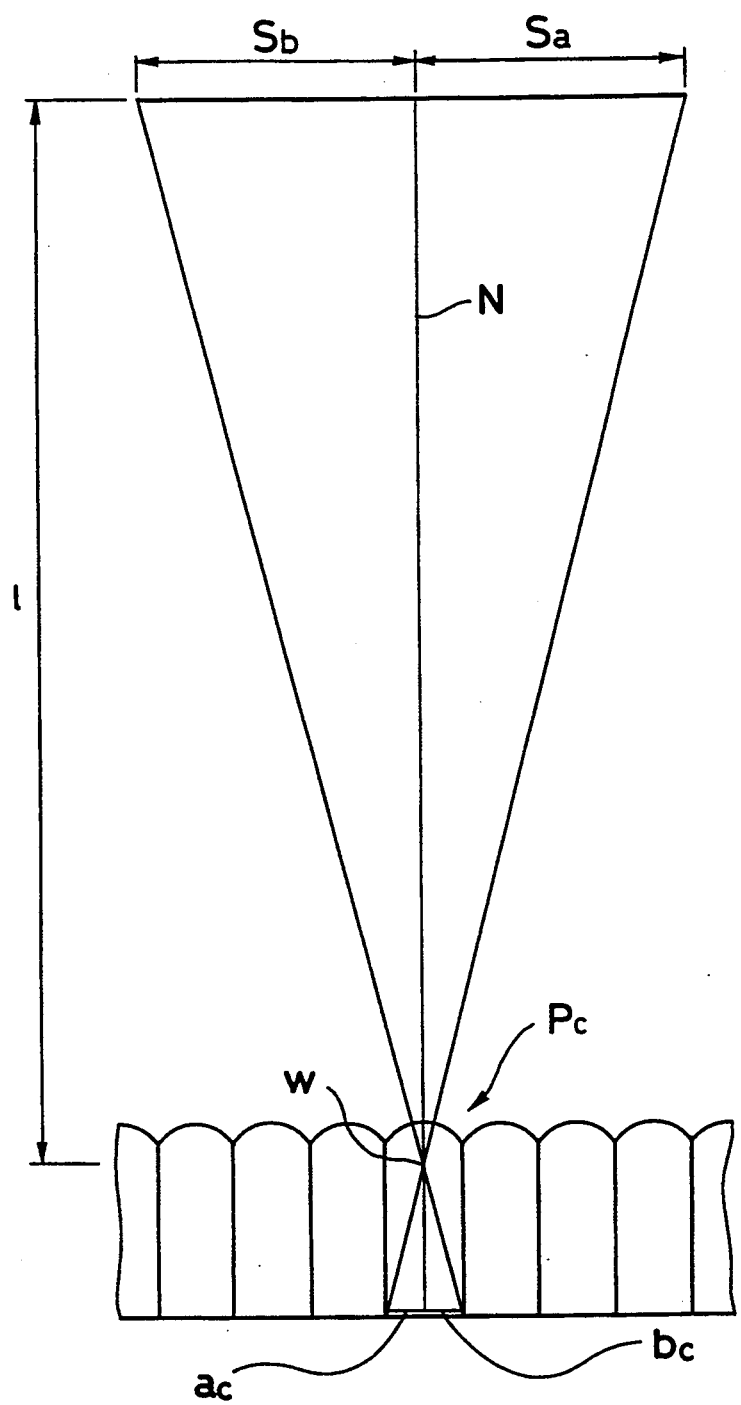
FIG. 4 is a diagram showing schematically a method of determining the regions of linear images in the viewing position on the stereoscopic image recording apparatus shown in FIG. 1.

In the embodiment as shown in FIG. 3, the lenticular recording material F has a recording layer D formed on the rear surface of a lenticular sheet C (or it has a recording material bonded to the rear surface of the lenticular sheet C); the lenticular sheet C has an array of lenticular lenses that have a predetermined curvature (as of a cylindrical surface or paraboloid) on the front side where rays of light are to be incident and which have a refractive power only in the direction where curvature exists. In a preferred embodiment, the recording apparatus 10 of the present invention performs recording of a stereoscopic image by "scanning exposure" which is effected from the rear side of the lenticular recording material F (where the recording layer D is provided).

The lenticular recording material F to be used with the recording apparatus 10 shown in FIG. 1 which performs exposure from the rear side of the material F has preferably an anti-halation layer formed between the lenticular sheet C and the recording layer D.

It should be noted here that the recording apparatus 10 shown in FIG. 1 is not solely applicable to the lenticular recording material F which is an integral assembly of the lenticular sheet C and the recording layer D. The apparatus is also applicable, with advantage, to the case where a recording material that has an image recorded thereon is bonded to a lenticular sheet so as to construct a lenticular recording material.

The recording apparatus 10 comprises basically the following components: an image processing means 12 that reads original images a and b photoelectrically and performs image processing of them to output image information that permits the completed stereoscopic image to come out correctly when it is viewed from the front side of the lenticular recording material F; an image forming means 14 that deflects in the fast scan direction (the main scan direction as indicated by arrow x in FIG. 1) a light beam L modulated in accordance with the image information supplied from the image processing means 12, that transports the lenticular recording material F in the slow scan direction (the sub-scan direction as indicated by arrow y in FIG. 1) which is generally perpendicular to the fast scan direction, and that scans over the lenticular recording material F two-dimensionally by means of the light beam L from the rear side (where the recording layer C is provided) so that a stereoscopic image is recorded through scanning exposure; and a means 16 for achieving registry in the recording of image on the lenticular recording material F.

The image processing means 12 comprises a reading unit 18 for reading original images a and b and a linear image processing unit 20 with which the image information read by the unit 18 is processed to image information on the linear images to be recorded on the lenticular recording material F.

The reading unit 18 reads original images a and b photoelectrically by a solid-state imaging means such as a CCD camera, a CCD sensor or an image scanner and transfers them to the linear image processing unit 20 as color image information which consists of electric signals of the respective original images (the color image information may be associated with the three primary colors R, G and B). The original images (image information) may be not only color images but also monochromatic images; they also are not limited to common photographic images and may be the images produced in medical or scientific photography such as radiography and fundusgraphy (photography of fundus oculi) or they may be the images generated by a computer. The image information to be transferred to the linear image processing unit 20 may be either digital or analog information.

In this connection, it should be mentioned (although a detailed discussion will be made later in this specification) that the image information readout from the reading unit 18 is subsequently processed to form linear images into which each original image has been separated and which are to be recorded on the lenticular recording material F. Hence, if desired, the reading of image information (in one line) by the reading unit 18 may be effected in correspondence to the linear images or one scan line defined by light beam L so as to obviate the need for splitting each original image into linear images by the linear image processing unit 20 (i.e., formation of electric single data on the linear images). In other words, a splitter 22 in the linear image processing unit 20 may be omitted in the case described above.

There are no particular limitations on the reading unit 18 that can be used in the present invention and any of the known image reading units can be used, including the use of a CCD sensor or other solid-state imaging means mentioned above in combination with scan reading of the original images by slit scanning, raster scanning, drum scanner, etc., as well as a unit that is capable of reading the original images in one shot as in common photography.

If desired, a plurality of reading units 18, preferably as many reading units as the original images, may be used to realize a system capable of reading a plurality of original images simultaneously. Alternatively, original images may be read sequentially with a single reading unit 18.

In a preferred embodiment, the recording apparatus 10 shown in FIG. 1 is adapted for recording a stereoscopic image from the rear side of the lenticular recording material F which is an integral assembly of the lenticular sheet C and the recording layer D. If the original images are read from the front side as in the case where they originate from a reflection document, they must be reversed inside out before recording. For this purpose, the reading unit 18 may be equipped with a means of reversing the original images inside out. There are no particular limitations on the reversal means and any of the known methods can be used such as the use of mirrors provided in the reading unit 18 or an "image processing" approach that effects reversal of the image information readout by signal processing. The reversal means is in no way limited to the one provided in the reading unit 18; it may be provided in the linear image processing unit 20. It should be mentioned here that in the case where a lenticular sheet is bonded to the recording material (the recording layer) after image recording has been effected on it, there is no need to provide the means of reversing the original images inside out since recording is eventually effected from the front side of the lenticular recording material.

If desired, the recording apparatus 10 may have a means of identifying the surface of original images (whether it is front or rear surface) for checking as to whether it is necessary to reverse the original images inside out, or a means of checking as to whether the original images are negative or positive.

There are no particular limitations on the method of identifying the surface of original images (whether it is obverse or reverse) or the method of checking as to whether the original images are negative or positive. Various methods may be used, such as mechanical or optical method of identification or checking that uses notches, sprocket holes, etc., and the provision of identification marks on the original images, which are read simultaneously with the reading of the original images to make check as to whether the surface of the original images is obverse or reverse. Alternatively, the operator may check as to whether the original images are obverse- or reverse-faced and he then enters the result while the reading unit 18 is reading the original images; or presetting is made as to whether the original images to be read by the reading unit 18 should be obverse- or reverse-faced and, depending on the setting, the operator may appropriately load the original images into the reading unit 18. In these alternative cases, there is no need to provide a special means of checking as to whether the original images are obverse- or reverse-faced or if they are negative or positive.

The recording apparatus 10 shown in FIG. 1 may be so composed that the principal object of each original image can be set by various methods such as designating the principal object by a digitizer or designating it on a display screen on the reading unit 18 by a suitable device such as a mouse. The means of setting the principal objects is not limited to the one that is provided on the reading unit 18; it may be provided on the linear image processing unit 20 that are to be described later in this specification; alternatively, the reading unit 18 or linear image processing unit 20 may automatically set the respective principal objects by making judgment on the basis of the image information readout.

The image information on the original images a and b that has been read by the reading unit 18 is then transferred to the linear image processing unit 20. The linear image processing unit 20 comprises a pre-image processor 21, a splitter (linear image former) 22, a recording position determining unit 24 and an image processor 26 and it splits each original image and forms linear images to be recorded on the basis of the image information on the original images a and b and determines the positions in which the linear images of the respective original images are to be recorded on the recording layer D in such a way that the completed stereoscopic image will come out correctly when it is viewed from the front side of the lenticular recording material F. Further, the linear image processing unit 20 sets various parameters such as the distance between linear images to be recorded, the width of linear images and the image recording regions on the basis of the specifications of the lenticular sheet C to be used and the recording conditions such as the magnification for image recording; after performing any necessary image processing operations such as density adjustment, color balance adjustment and sharpness correction, the processing unit 20 will transfer the image information on stereoscopic recording to the image forming unit 14.

First, in the linear image processing unit 20, the image information on the original images a and b that have been sent from the reading unit 18 is transferred to the pre-image processor 21. On the basis of the image information on the original images, the pre-image processor 21 checks for the need to perform various image processing operations including the correction of various parameters such as color balance, density balance and sharpness, as well as edge enhancement and, if any of these image processing operations are found to be necessary, the pre-image processor will function accordingly. If desired, those correcting and image processing operations may be performed in response to manual data entry by the operator; alternatively, automatic judgment by the pre-image processor 21 may be combined with manual entry by the operator. In a special case, the pre-image processor 21 may be replaced by the image former 14 which is modified to perform the same function as the pre-image processor 21.

Next, in the splitter 22, on the basis of the processed image information the original images are split into linear images to be recorded on the lenticular recording material F.

Figure 13:
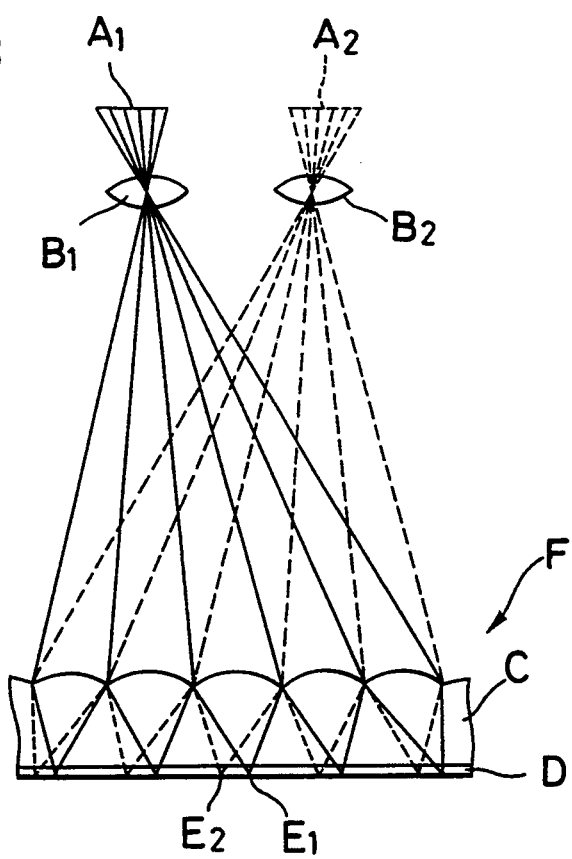
FIG. 13 is a diagram showing how image is recorded on a conventional lenticular recording material.
Figure 14:
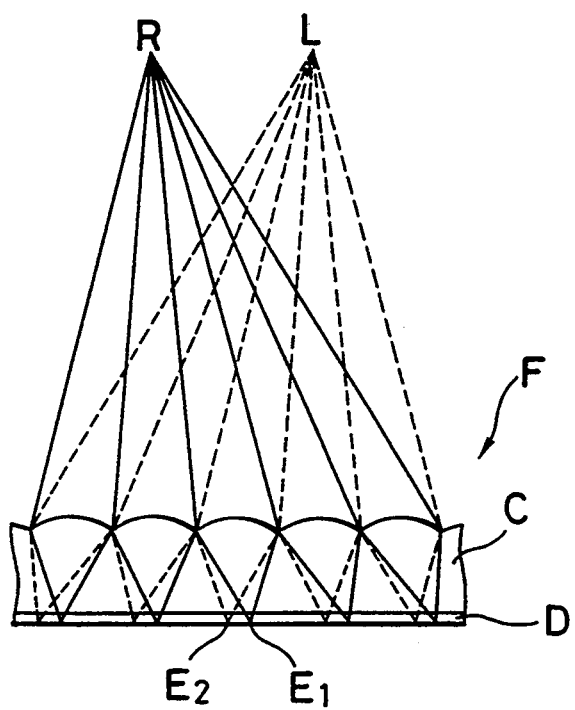
FIG. 14 is a diagram showing the theory behind the production of stereoscopic vision of the image recorded on a lenticular recording material.

As already mentioned, the optical stereoscopic image recording system which causes the projecting light from the original images to be printed on the recording layer of the (lenticular) recording material is such that the projecting light from the original images is projected through projection lenses and split by the lenticular sheet C into linear images, which are then recorded on the recording layer (see FIG. 13).

In contrast, the recording apparatus 10 of the present invention reads the original images photoelectrically and performs scanning exposure to record a complete stereoscopic image on the recording material. The linear images into which each original image has been split and which are to be recorded on the recording layer D are electrically formed in accordance with various factors such as the stereoscopic image to be recorded and the specifications of the lenticular sheet C by image information processing by means of electric signal processing on the basis of the image information on the original images a and b which have been read by the reading unit 18.

Figure 2:
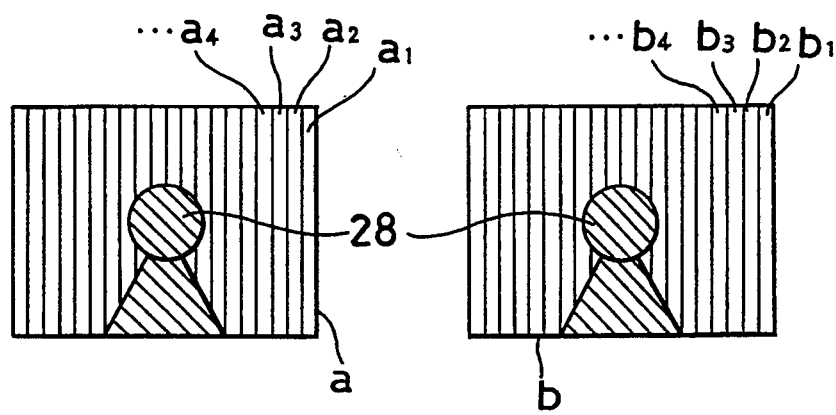
FIG. 2 shows conceptually how linear images are formed from original images with the stereoscopic image recording apparatus shown in FIG. 1.

The image information from the reading unit 18 is usually transferred to the linear image processing unit 20 as line image information that corresponds to one line of readout (one scan) from the reading unit 18. Therefore, if the line image information corresponds to the linear images to be recorded, using the line image information from the reading unit 18 or synthesizing (or splitting) the line image information as required, are formed the linear images that are to be recorded and which are the result of splitting of individual original images, for example, as shown in FIG. 2; linear images $a_1, a_2, a_3, a_4, \ldots a_n$ are formed from the original image a; and linear images $b_1, b_2, b_3, b_4, \ldots b_n$ are formed from the original image b.

The formation of linear images (splitting of each original image) may be done appropriately in accordance with the conditions of reading original images by the reading unit 18 or the conditions of recording stereoscopic images; such as the resolution of the reading unit 18 (as expressed by the number of read/scan lines, n), the pitch P of lenticular lenses on the lenticular sheet C, the recording magnification of stereoscopic image (or the recording size as compared to the size of original image), the total number of pitches within one recording range of the lenticular recording material F, the spot diameter (effective write spot diameter) of light beam L incident on the lenticular recording material F, and the number of original images.

The various conditions of recording a stereoscopic image, such as the specifications of the lenticular sheet (e.g. pitch P), the size of the stereoscopic image to be recorded and the recording magnification of the stereoscopic image, may be entered preliminarily by the operator or, alternatively, they may be set automatically by a suitable method such as prescanning of the original images or the selection of an appropriate lenticular recording material F to be used. If desired, entry by the operator may be combined with automatic setting of the recording conditions.

If, as mentioned previously, the reading apparatus 18 reads image information as line image information (preferably, the reading is performed in correspondence with the linear images and, more preferably, the number of read/scan lines is equal to the total number of lenticular lenses used in the recording of the stereoscopic images), the line image information corresponding to one line of readout from the reading unit 18 is made into the linear image, and the splitter 22 may be omitted.

The information in the linear images of original images that have been formed by the splitter 22 is then transferred to the recording position determining unit 24, which determines the positions of recording onto the lenticular recording material F in such a way that the completed stereoscopic image will come out correctly when it is viewed from the front side of that lenticular recording material F.

In the case under consideration where two original images a and b are read to record a stereoscopic image, those portions of the linear images which correspond to the respective original images and which are to be sequenced within one pitch (P) of lenticular lenses on the lenticular sheet C are put together, whereby the linear images of the respective original images are arranged sequentially in the order of $a_1, b_1, a_2, b_2, a_3, b_3, \ldots$ as shown in FIG. 3, and furthermore, the recording positions of the respective linear images are determined.

In the present invention, the recording positions of the respective linear images are determined in such a way that in accordance with the conditions for viewing the stereoscopic image to be produced and the specifications of the lenticular sheet used, etc., all of the linear images for the nth original image to be recorded in association with each lenticular lens will fall within the same area at the intended viewing position.

An example of this method for determining the recording positions of linear images is described below with reference to the case of duplicating two original image.

Assume, for example, that the linear images $a_c$ and $b_c$ of the two original images a and b, respectively, are recorded in such a way that they divide, into two equal portions, the range of the stereoscopic image that is in its central area and which corresponds to a lenticular lens Pc. In this case, area Sa (or Sb) where the linear image $a_c$ (or $b_c$) is to be viewed at the viewing distance 1 is defined by the points of intersection of the viewing position and extensions of the straight lines connecting both ends of the linear image $a_c$ (or $b_c$) to the center of curvature w of the lenticular lens Pc.

In this connection, it should be noted that the center line N passing through the lenticular lens Pc to extend between the linear images $a_c$ and $b_c$ is also the center line through the stereoscopic image to be produced.

Consider here the conditions that must be satisfied in order to insure that the linear images recorded in association with all lenticular lenses will fall within areas Sa and Sb. For the sake of simplicity, particular attention is paid here to lenticular lens Px in position x (see FIG. 5). The thickness t of each of the lenticular lenses that compose the lenticular sheet C is expressed as $t = \{n/(n-1)\} \times r$, where n is the refractive index of the lenticular lens and r is the radius of the same lens (the lenticular sheet is usually designed in accordance with that formula). Therefore, in order to insure that the linear image of original image a will fall within area Sa whereas the linear image of original image b will fall within area Sb, the following two conditions must be met:

a) that the linear image of original image a should be recorded within the range $d_a$ defined both by the point at which the straight line $ls_1$ connecting the left end $s_1$ of the viewing position determined by area Sa at the viewing distance 1 and the center of curvature w of the lenticular lens Px intersects the light-sensitive layer D and by the point at which the straight line $ls_2$ connecting the center $s_2$ of the viewing position and the center of curvature w intersects the light-sensitive layer D; and b) that the linear image of original image b should be recorded within the range $d_b$ defined both by the point at which the straight line $ls_3$ connecting the right end $s_3$ of the viewing position and the center of curvature w intersects the light-sensitive layer D and by the point at which the straight line $ls_2$ intersects the light-sensitive layer D.

Let us assume here that $x=mP$ (x is the distance of the lenticular lens Px from the center of the stereoscopic image to be produced as denoted by the center line N; m is the number of lenticules by which Px is spaced from the center; and P is the pitch of lenticular lenses on the lenticular sheet F). Also assume that the straight line $ls_1$ forms the angle $\theta_1$ with the normal line M passing through the center of curvature w whereas the straight line $ls_2$ forms the angle $\theta_2$ with the normal line M. Then, the range over which the plurality of linear images (two linear images if the number of original images is two as in the case under consideration) are to be recorded in the lenticular lens Px is determined in such a way that the right end of that range will be located at the position distant from the center of the stereoscopic image by the amount $x+(t-r)\tan\theta_1$ whereas the left end will be located at the position that is distant from the center of the stereoscopic image by the amount $x+(t-r)\tan\theta_2$. If the determined recording range is divided in accordance with the linear images $a_c$ and $b_c$ recorded on the lenticular lens Px (in the case shown in FIG. 5, the range is divided into two equal zones) so that the linear image $a_x$ of original image a is recorded within zone $d_a$ whereas the linear image $b_x$ of original image b is recorded within zone $d_b$. Then, at the viewing position, the linear images of original image a are recorded within area Sa whereas the linear images of original image b are recorded within are Sb.

Figure 5:
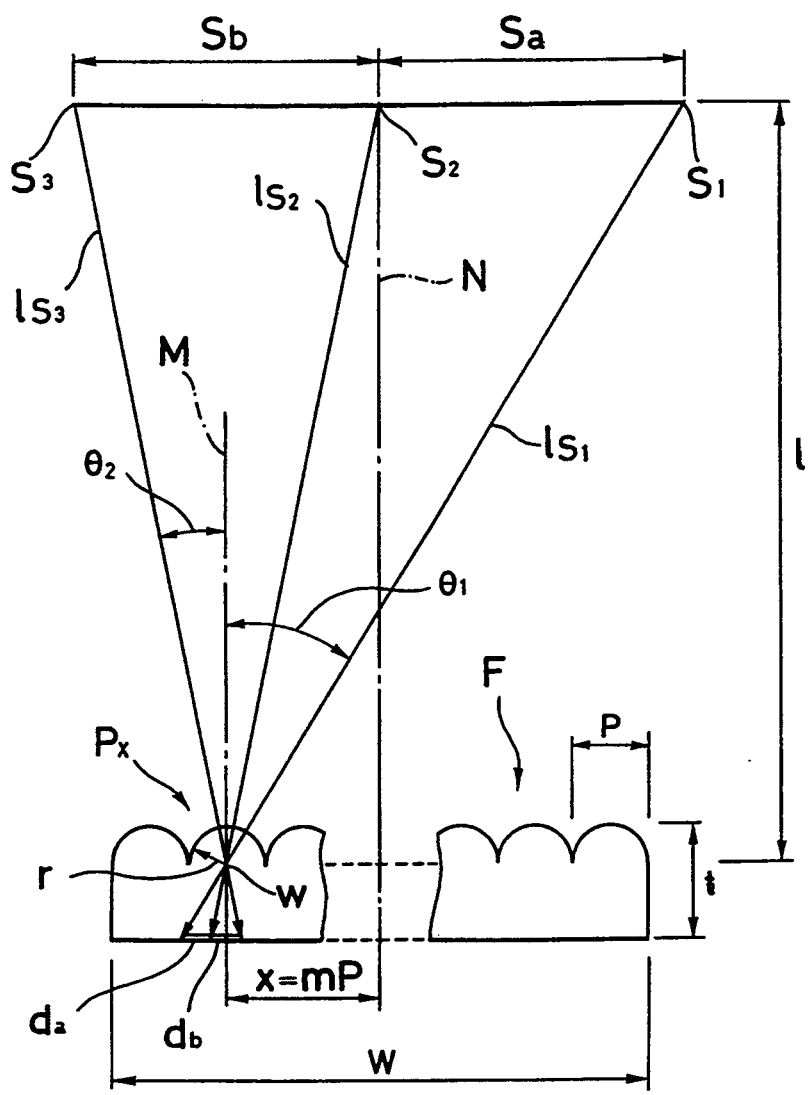
FIG. 5 is a diagram showing schematically the method of determining the positions in which linear images are to be recorded with the stereoscopic image recording apparatus shown in FIG. 1.

As one can see from FIG. 5, $\theta_1$ and $\theta_2$ can be expressed by $\tan^{-1}\{(x+Sa)/1\}$ and $\tan^{-1}\{(x=Sb)/1\}$, respectively.

Similar calculations are performed in association with all other lenticular lenses and the recording ranges of the respective linear images are so set that the recording positions of the linear images are determined to lie within those ranges. If the linear images are recorded in accordance with the thus determined positions, a stereoscopic image of high quality can be produced without suffering from image flickering or multiple image that would otherwise occur if unwanted linear images (of original images) were viewed by the right or left eye or if the area where no image is recorded fell within the visual field.

Figure 6:
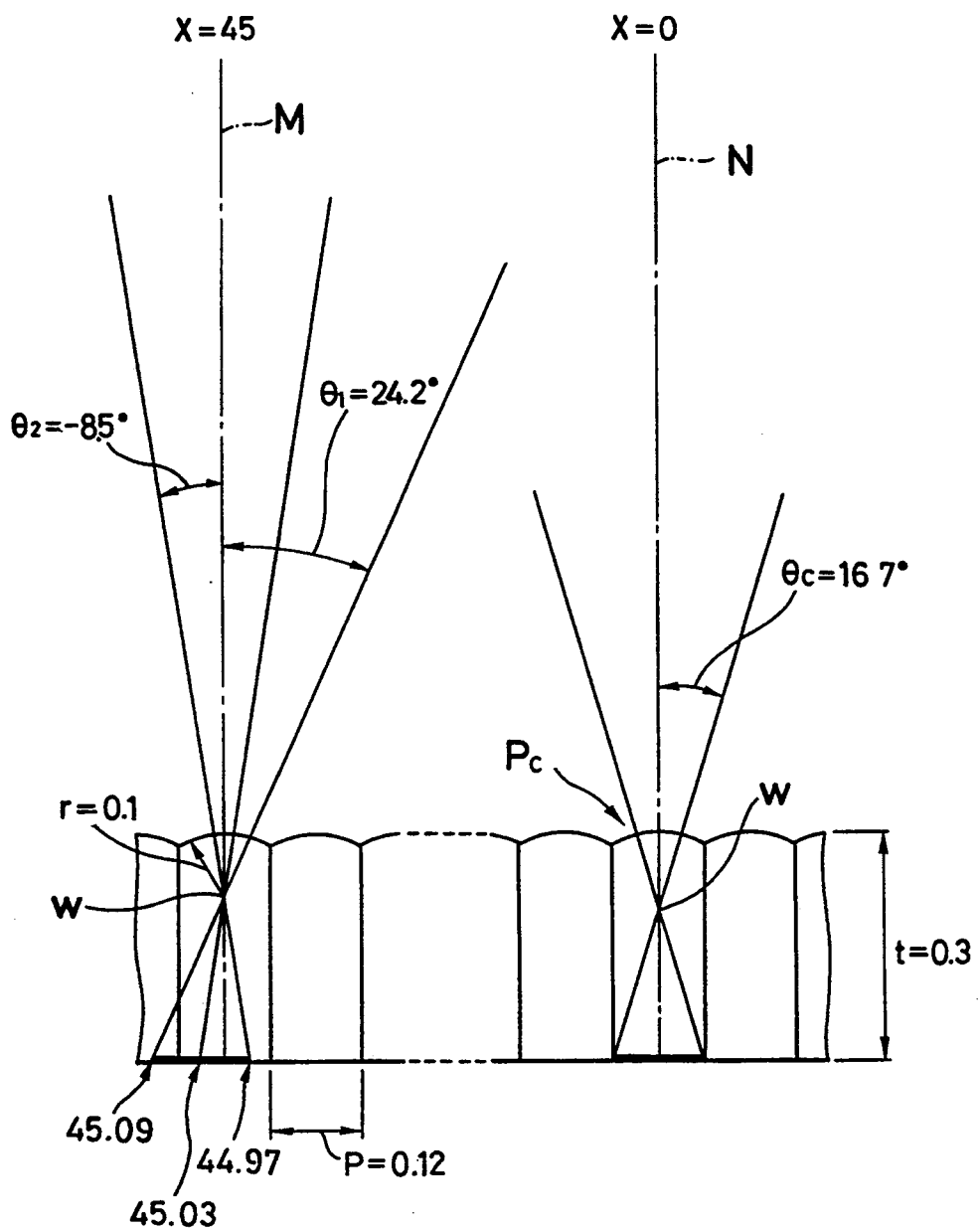
FIG. 6 is a diagram showing schematically an example of the positions in which linear images are to be recorded with the stereoscopic image recording apparatus shown in FIG. 1.

FIG. 6 shows a specific example of the positions at which linear images are to be recorded in a lenticular lens that is distant from the center of the stereoscopic image by distance (x) of 45 mm.

The case shown in FIG. 6 assumes that the pitch P of lenticular lenses on the lenticular sheet F is 0.12 mm, that each lenticular lens has a thickness (t) of 0.3 mm and a radius of curvature (r) of 0.1 mm and that the viewing distance (l) is 300 mm. Consider here the lenticular lens Pc which corresponds to the center of the stereoscopic image (x=0). One may then record linear images that fully cover the two equal zones into which the pitch of Pc is divided and set accordingly the areas Sa and Sb for the linear images of the original images of interest at the viewing position.

In the case shown, $$\theta c = \tan^{-1}(0.06/0.2) = 16.7°$$

Hence, each of the areas Sa and Sb has a length that is expressed by:

$$l \tan \theta c = 300 \times (0.12/2) \times 0.2 = 90 \text{ mm}$$

At the position where $x=45$ mm, $\theta_1$ and $\theta_2$ are expressed as follows:

$$\theta_1 = \tan^{-1}\{(x+Sa)/1\}$$
$$= \tan^{-1}\{(45+90)/300\} = 24.2°$$

$$\theta_2 = \tan^{-1}\{(x-Sb)/1\}$$
$$= \tan^{-1}\{(45-90)/300\} = -8.5°$$

Therefore, the area over which the linear images of the original images corresponding to the lenticular lens P at $x=45$ mm is determined in such a way that the right end is situated at the position expressed by:

$$x+(t-r) \tan \theta_1 = 45+(0.3-0.1) \tan 24.2 = 45.09 \text{ mm}$$

whereas the left end is situated at the position expressed by:

$$x+(t-r) \tan \theta_2 = 45+(0.3-0.1) \tan (-8.5) = 44.97 \text{ mm}$$

In the case under consideration, the linear images of the two original images are recorded in the lenticular lens Pc as said lens is divided into two equal zones. Hence, one may divide the determined recording area into two equal ranges so that the linear image of original image a is recorded within the range of 45.09–45.03 mm whereas the linear image of original image b is recorded within the range of 45.03–44.97 mm.

If one wants to record linear images at the position of $x=-45$ mm which is in symmetry with the position of $x=45$ mm with respect to the center line N, he may reverse the procedure followed in the above case of $x=45$ mm.

Figure 7:
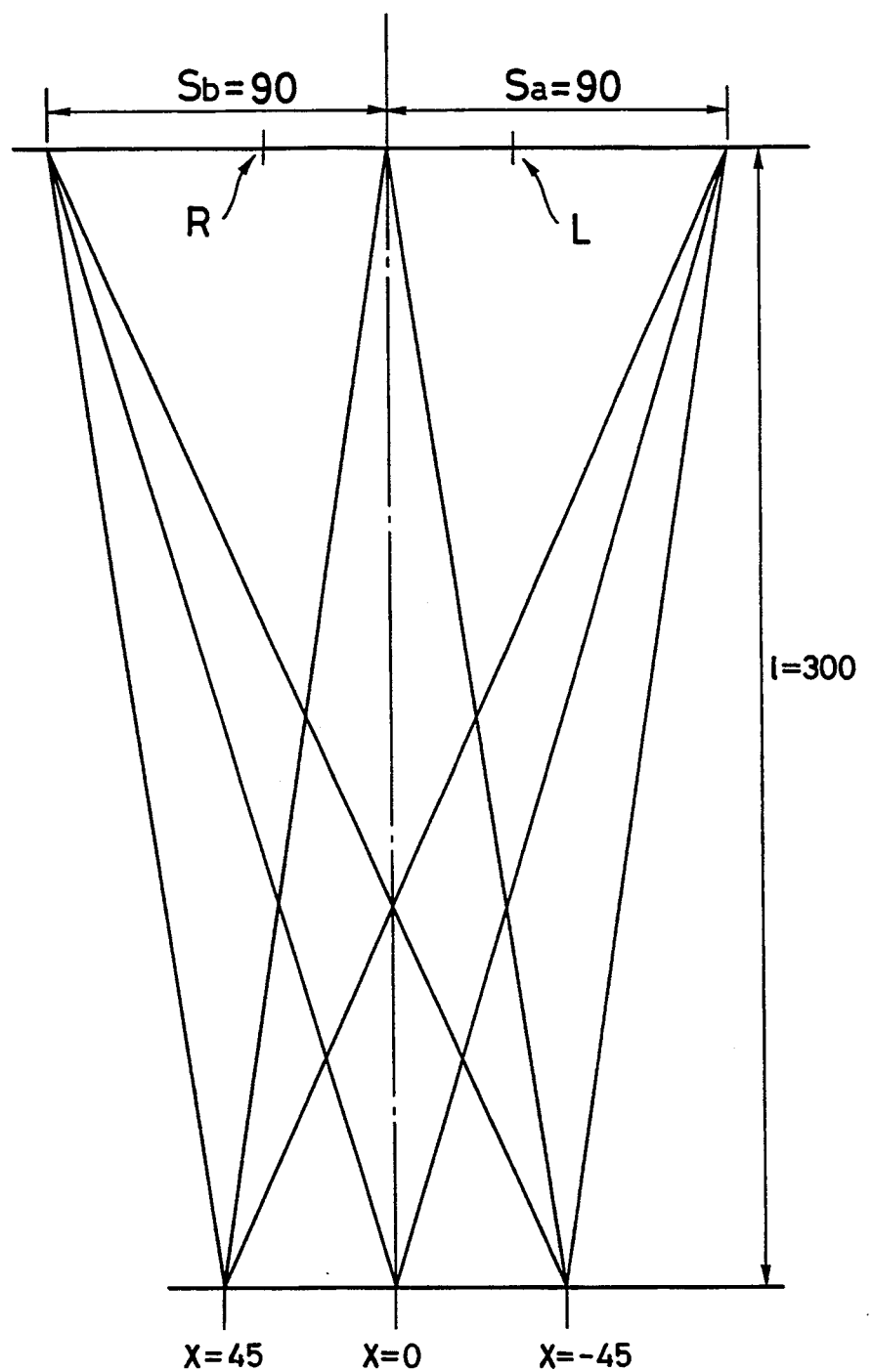
FIG. 7 is a diagram showing schematically how linear images will look like in the case shown in FIG. 6.

FIG. 7 shows schematically how the linear images look like depending on the position of lenticular lens, whether it is recorded in the center of the stereoscopic image (x=0) or at x=45 mm (as shown in FIG. 6) or at $x=-45$ mm. Symbol R denotes the position of the right eye of the viewer when he looks at the stereoscopic image from the central position (x=0) and L denotes the position of his left eye.

While the foregoing description concerns the recording of a stereoscopic image on the basis of two original images, it should be noted that the recording positions of linear images can also be determined by a similar procedure even if the number of original images to be reproduced is three or more.

Figure 8:
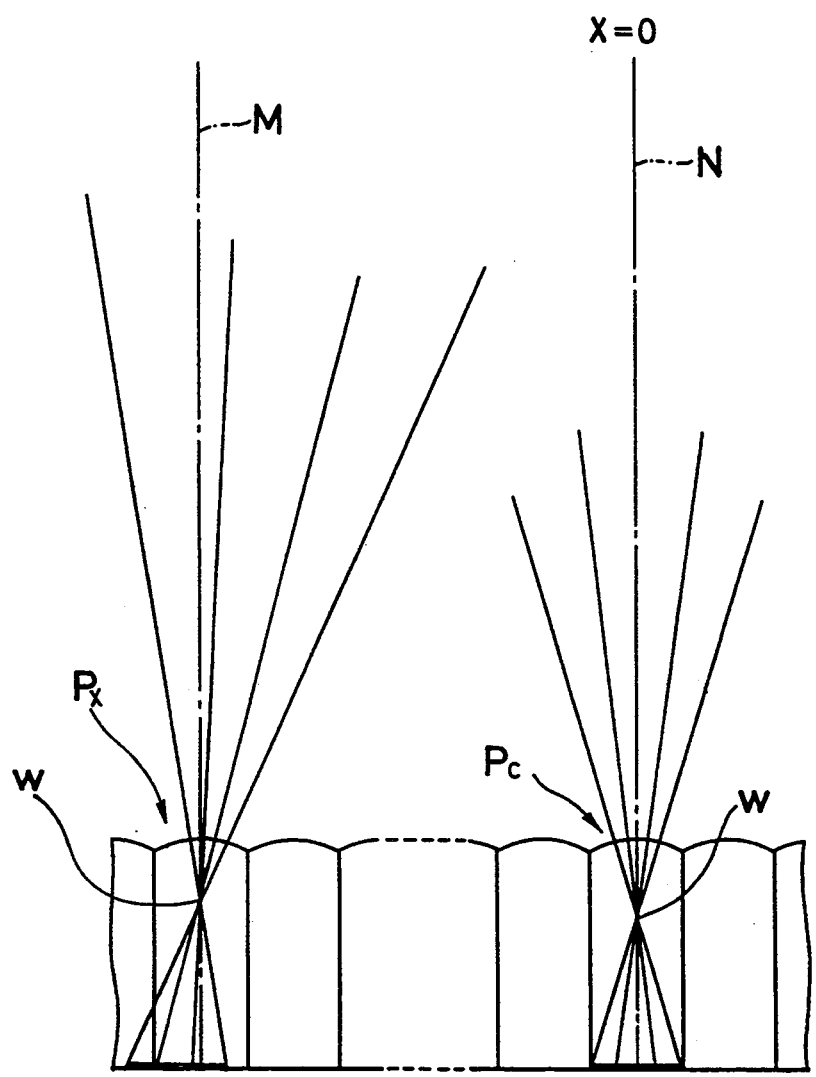
FIG. 8 is a diagram showing schematically the recording positions of linear images in an exemplary case where the concept of the present invention is applied to the recording of a stereoscopic image from three original images.

Consider, for example, the case of duplicating three original images. First, the range over which the respective linear images are to be recorded in the central lenticular lens Pc is set. Then, the range of recording the linear images is determined accordingly (in terms of both the right and left ends) in the same manner. In conformance with the recording of linear images of the respective original images in the lenticular lens Pc (e.g., if the linear images of the respective original images are recorded in three equally divided zones of the lenticular lens Pc as shown in FIG. 8, the determined recording range is divided into three equal areas; if, on the other hand, the linear images of the respective original images are recorded in the lenticular lens Pc at the ratio 2:6:2 according to the parallax order, the determined recording range is divided at the corresponding ratio 2:6:2), the recording positions of the respective linear images are determined to lie within the divided areas. Substantially the same procedure will apply to the case where four or more original images are to be reproduced.

It should also be noted that the setting of the recording range of linear images in association with the central lenticular lens Pc is in no way limited to the case where they are recorded in such a way that they cover said range fully as described above. The extent to which the linear images are to be recorded in the range of interest may be determined in accordance with various factors including the spot diameter of light beam L for recording the linear images, the quality of lenticular sheet C (in case of an inexpensive lenticular sheet, only the central portion of each lenticular lens is preferably used in order to provide good image quality), the pitch P of lenticular lenses on the lenticular sheet C and the number of original images to be duplicated. In this alternative case, the recording positions of the individual linear images may be set in such a way that one recording position is spaced from an adjacent position.

In the foregoing description, the range over which the respective linear images are to be recorded in the central lenticular lens Pc are so set that the areas for those linear images at the viewing position are assumed to determine the position in which the linear images are to be recorded on the light-sensitive recording layer D. However, this is not the sole case of the present invention and depending on the viewing conditions such as the viewing distance 1 and the distance between the two eyes of the viewer (which is normally 65 mm), the areas of the linear images at the viewing position (i.e., the areas in which the viewer's eyes will move) may be assumed so that the recording positions of the linear images can accordingly be determined.

While the recording positions of linear images are determined on the basis of the recording range (its right and left ends) as computed for the linear images in the manner described above, it should of course be understood that depending on the specifications of the lenticular sheet (lenticular lenses) such as its precision, viewing distance, the size of stereoscopic image to be produced, the pitch of lenticular lenses, their curvature, as well as the variations in the pitch and curvature of the lenses, the linear may be recorded outside the computed recording ranges.

The term "viewing distance 1" as used in the foregoing description means the distance from the viewing position of the viewer to the center of curvature of a lenticular lens of interest as shown in FIG. 5. Since the thickness of common lenticular lenses. (ca. 1 mm) and their center of curvature (a fraction of the lens thickness) are much smaller than the viewing distance (usually about 250 mm for the photopic eye), the viewing distance 1 may safely be approximated by the distance from the position of both eyes to either the back side or front side of the lenticular light-sensitive material F.

Needless to say, the recording positions of linear images should be determined (the linear images should be sequenced) in the recording position determining unit 24 in accordance with the principal object setting (as indicated by 28 in FIG. 2) or according to whether the original images are obverse- or reverse-faced, so that the stereoscopic image to be eventually formed on the recording layer D will come out satisfactorily when it is viewed through the lenticular sheet C.

The information in the linear images of the respective original images that have been sequenced in a predetermined order are then transferred to the image processor 26. In the image processor 26, the image information is processed in accordance with preset recording conditions such as the number of linear images formed (or the number of read/scan lines), the pitch P of lenticular lenses on the lenticular sheet C, the recording magnification (which may be set on the basis of the sizes of original images and the recorded image), the number of original images, the beam spot diameter of light beam L, and the total number of lenticular lenses used on the lenticular sheet C, and the output is delivered to the image forming means 14 as image information to be recorded on the lenticular recording material F.

If one wants to produce an even better stereoscopic image that is substantially free of flickers, he may perform an additional step of image processing in order to paint with a solid black color all the areas other than those determined for the recording of linear images and the boundaries between adjacent linear images. In particular, if the image forming medium is of such a nature that bleeding of image tends to occur, image sharpness can be enhanced by painting the borders between adjacent linear images of different original images with a black color.

The image forming means 14 deflects in the fast scan direction (x direction) the light beam modulated in accordance with the linear image information transferred from the linear image processing unit 20 and transports the lenticular recording material F in the slow scan direction (y direction) which is generally perpendicular to the fast scan direction, whereby the lenticular recording material F is scanned over two-dimensionally from the rear side so as to record a stereoscopic image. The image forming means 14 has a light beam issuing means by which the light beams LR, LG and LB modulated in accordance with the linear image information are merged into a single beam for issuing, and a light beam scanning means by which the lenticular recording material F is scanned over two-dimensionally from the rear side with the merged light beam L.

In the image forming means 14, the linear image information transferred from the linear image processing unit 20 is first transferred to an exposure control circuit 30. The exposure control circuit 30 receives linear image information from the line image processing unit 20, namely, the information on R (red) signal, G (green) signal and B (blue) signal, and in accordance with the supplied image information signals, the circuit 30 performs not only D/A conversion but also various operations of exposure correction and signal processing and calculates the amount of exposure for each of the pixels in one line for R, G and B, thereby determining the amount of exposure (modulation) for each of the pixels in one line for the respective light sources 32 (32R, 32G and 32B); thereafter, the image information signal is transferred to a nonlinear amplifier 35.

The nonlinear amplifier 35 is chiefly intended to compensate for the nonlinearity of an AOM (acoustooptical modulator) assembly 39; the image information signals corrected by the nonlinear amplifier 35 are transferred to drive circuits 37 (37R, 37G and 37B) for AOM assembly 39, whereupon the AOM assembly 39 (39R, 39G and 39B) is driven.

The light sources 32 will emit light beams at wavelengths of narrow band, to which the light-sensitive layers provided in the recording layer D of the lenticular recording material F, e.g., a red (R) sensitive layer, a green (G) sensitive layer and a blue (B) sensitive layer (see FIG. 9), have sensitivity; the light source 32R will emit a light beam $L_R$ for exposing the R sensitive layer in the lenticular recording material F; the light source 32G will emit a light beam $L_G$ for exposing the G sensitive layer in the lenticular recording material F; and the light source 32B will emit a light beam $L_B$ for exposing the B sensitive layer in the lenticular recording material F; the light beams $L_R$, $L_G$ and $L_B$ each have a constant output.

The sources of light beams that can be used in the present invention are in no way limited and any source of light beam may be used, as appropriately selected from among gas lasers (e.g. He-Ne laser), a variety of solid-state lasers, semiconductor lasers and LEDs depending on such factors as the type of recording layer D of the lenticular recording material F. If the recording layer D of the lenticular recording material F has spectral sensitivity in the visible range, a He-Ne laser corresponding to the R sensitive layer, an Ar laser corresponding to the G sensitive layer, and a He-Cd laser corresponding to the B sensitive layer may advantageously be used as light sources. If the recording layer is made of a false color light-sensitive material, a semiconductor laser (LD) or the like may advantageously be used. If desired, a light valve may be used as light source.

The light beams $L_R$, $L_G$ and $L_B$ emitted from the associated light sources 32 have their beam spot diameter and other parameters adjusted by shaping means 40 (40R, 40G and 40B) such as beam expanders, collimator lenses, etc. that are provided in association with the respective light beams.

The light beams $L_R$, $L_G$ and $L_B$ are subsequently launched into associated AOMs 39 (39R, 39G and 39B). Since the AOMs 39 are driven in association with the images (linear images) to be recorded, the intensities of the respective light beams that have been launched into the associated AOMs 39 are modulated in accordance with the images to be recorded. It should be mentioned here that the optical modulators that can be used with the recording apparatus 10 of the present invention are not limited to the AOMs 39 shown in FIG. 1 and any other optical modulators are applicable, as exemplified by a magnetooptical modulator and an electrooptical modulator.

The light beams modulated by the AOMs 39 are merged into a single light beam L by means of a light beam merger that is composed of two dichroic mirrors 42 and 44 and a single mirror 46. The dichroic mirror 42 reflects a light beam having the wavelength of light beam $L_R$ while transmitting the other light beams; the dichroic mirror 44 reflects a light beam having the wavelength of light beam $L_G$ while transmitting the other light beams. Therefore, the light beam $L_B$ is reflected by the mirror 46 and passes through the dichroic mirrors 42 and 44; the light beam $L_G$ is reflected by the dichroic mirror 44 and passes through the dichroic mirror 42; and the light beam $L_R$ is reflected by the dichroic mirror 42; consequently, the three light beams are merged into a single light beam. It should be mentioned here that the dichroic mirror 42 suffices to transmit at least the light beams $L_B$ and $L_G$ while reflecting the light beam $L_R$, and that the dichroic mirror 44 suffices to transmit at least the light beam $L_B$ while reflecting the light beam $L_G$.

The merged single light beam L is then incident on the polygonal mirror 34 working as a light deflector and is deflected in the fast scan direction (as indicated by arrow x in FIG. 1). The light deflector that can be used with the recording apparatus of the present invention is in no way limited to the polygonal mirror 34 and any known light deflector may be used, such as a galvanometer mirror or a resonant scanner. Needless to say, optics for correcting the tilting of the polygonal mirror 34 (light deflector) that is composed of cylindrical lenses, cylindrical mirrors, etc. may be provided across the polygonal mirror 34.

It should also be noted here that the present invention is in no way limited to the case of using "merging" optics in which a plurality of light beams are merged for image recording as shown in FIG. 1. Non-merging optics may also be used in either of the following to methods: the three light beams are allowed to be incident at essentially the same point on reflecting face of the polygonal mirror 34 but at slightly different angles, whereby the light beams are deflected in the fast scan direction so as to focus at different positions on the same scan line SL across the lenticular recording material F, with the scan line SL being scanned over sequentially at given time intervals; alternatively, the three light beams are allowed to travel at slightly different angles so that they will be incident at essentially the same point on the lenticular recording material F.

The light beam L deflected in the fast scan direction is adjusted by an $f\theta$ lens 48 so that it will be focused as a beam spot of a predetermined diameter in a predetermined position on the lenticular recording material F; thereafter, the light beam L is reflected in a predetermined direction by means of a bend-down mirror 49 so that it is incident at a predetermined position on the rear side of the lenticular recording material F, thereby defining a scan line SL for exposing the recording layer D.

In the method and apparatus of the present invention, the linear images are recorded at the positions which is determined in accordance with the assumed viewing conditions of the stereoscopic image, the specifications of the lenticular sheet used and other factors.

In the embodiments as shown in FIG. 1, the linear images are recorded directly on the recording layer D of the lenticular recording material F by scan exposure from the rear side by means of the light beam L (or the recording material is bonded to the lenticular sheet C after the linear images is exposed directly on the recording material) without letting the exposing light pass through the lenticular sheet C and, hence the recording positions of the linear images and the recording areas thereof can be easily adjusted to any positions and areas, thereby enabling a stereoscopic image of high quality to be recorded without multiple image or flickering.

The lenticular recording material F is transported by a slow scan transport means in the slow scan direction (indicated by arrow y in FIG. 1) generally perpendicular to the fast scan direction in such a way that the direction of the generatrix of the lenticular sheet C (its longitudinal direction) is in general agreement (generally parallel) to the fast scan direction. Therefore, the light beam L is eventually capable of two-dimensional scan exposure of the lenticular recording material F and, as shown in FIG. 3 (the fast scan direction is normal to the paper), the linear images of the original images are sequentially recorded at predetermined positions in a predetermined order (e.g., $a_1$, $b_1$, $c_1$, $d_1$, $a_2$, $b_2$, ... ) in accordance with the recording positions (sequence) of the linear images that have been set by the linear image processing unit 20.

The linear images of the original images are in no way limited to the case where they are recorded by a single scan with the light beam L; if desired, more than one scanning with the light beam may be performed to record one linear image (how many scans should be done depends on the width set for individual linear images). Needless to say, scan lines SL that are at least equal in number to the original images must be defined within one pitch P of the lenticular recording material F.

The means of transporting the lenticular recording material F in the slow scan direction is in no way limited and various known means for transporting sheet products may be used, as exemplified by: the use of two pairs of nip rollers that are disposed across scan line SL; the use of an exposure drum supporting the lenticular recording material F and two pairs of nip rollers that are disposed across scan line SL and which depress the exposure drum; the use of an exposure mount that secures the lenticular recording material F in a predetermined position by means of suction, etc. and which is moved by means of a screw transmission mechanism, etc.; and the use of belt conveyor.

The fast scan direction need not always coincide with the direction of the generatrix of the lenticular sheet C and it goes without saying that image recording may be performed with the slow scan direction being in agreement with the direction of the generatrix. However, for several reasons such as the relative ease in image processing and the possibility of recording a single continuous linear image, it is advantageous to have the fast scan direction coincide with the direction of the generatrix and, at the same time, one can anticipate the recording of high-quality stereoscopic images.

Then, in order to record the stereoscopic image of higher quality, by adjusting the recording width of the linear images, the linear images can be recorded preferably without overlapping the determined image recording areas and without leaving any blank portions (gaps).

As the method of adjusting recording widths of linear images, any methods of adjusting the width of the linear images for respective original images are applicable, as exemplified by a method of increasing the recording width of linear images in which a beam expander and other means are used to increase the line width of the linear images to be recorded, a method of recording linear images repeatedly, a method of adjusting the width of linear images to be formed, optical methods of using optical members, and image processing approaches to be performed by the linear image processing unit 20, etc.

The recording apparatus shown in FIG. 1 uses an optical modulator such as AOM 39 to modulate light beams but this is not the sole case of the present invention and the same result can be attained by pulse width modulation of light emission from the light sources 32 or by electrical intensity modulation of the light sources 32.

Figure 9:
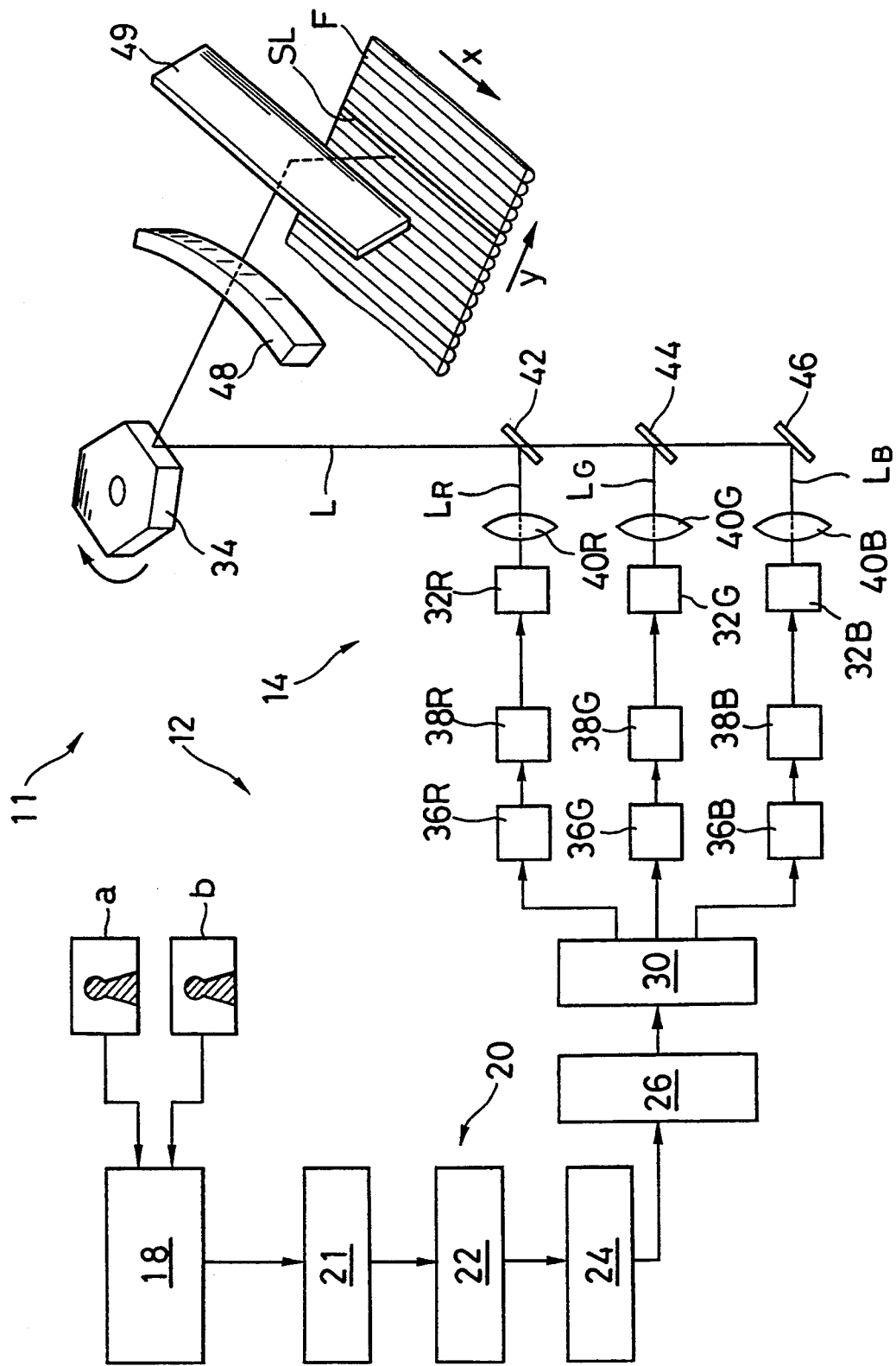
FIG. 9 is a diagram showing the concept of a stereoscopic image recording apparatus according to another embodiment of the present invention.

FIG. 9 shows an example of recording apparatus that modulates light beams by pulse width modulation. The recording apparatus generally indicated by 11 in FIG. 9 has basically the same construction as the recording apparatus 10 except for the method of modulating light beams; hence, the members that are the same as those which are shown in FIG. 1 are identified by like numerals and will not be described in detail.

Referring to the recording apparatus 11 shown in FIG. 9, the exposure control circuit 30 determines the amount of exposure for one line of pixels in connection with each of the three light sources 32 (32R, 32G and 32B) and the thus determined amounts of exposure are transferred to modulation circuits 36. The modulation circuits 36 perform pulse width modulation on the light emission from the light sources 32 within a preset repetition period, say, one pixel period. When performing pulse width modulation in the image exposure system under consideration, the optical output of each light source 32 is set at a constant level and the time for which the light source 32 is excited to produce continuous emission within one pixel period for each pixel, namely, one continuous exposure time (for one pixel) is delivered to each drive circuit 38.

Drive circuits 38 (38R, 38G and 38B) are for driving the light sources 32 and, in the case of pulse width modulation, they supply the respective light sources 32 with drive currents for the optical outputs preset for those light sources for the time periods set for the individual pixels. As a result, each light source 32 emits light of the optical output present for each light source for the time period determined for each light source in association with the ith pixel. This is effected for one line of pixels, whereby each light source 32 performs one-line exposure.

The light beams $L_R$, $L_G$ and $L_B$ issuing from the light sources 32 are shaped by associated shaping means 40 (40R, 40G and 40B) and then merged into a single light beam by means of a light beam merger to be described later in this specification; the resulting single light beam is used to expose the lenticular recording material F by scanning.

As already mentioned, both recording apparatus 10 and 11 perform image recording on the lenticular recording material F with the light beam L deflected in the fast scan direction as it is moved in the slow scan direction, In addition, the direction of the generatrix of the lenticular sheet C is generally in agreement with the fast scan direction. If, under the circumstances, the lenticular recording material F is transported continuously, the scan lines SL defined by the light beam L will form an angle with respect to the generatrix of the lenticular sheet C.

With ordinary image recording apparatus, this deviation of scan lines SL will not be a serious problem; however, when one attempts to record a stereoscopic image using the lenticular sheet C as in the case of the present invention, the deviation of scan lines SL with respect to the generatrix of the lenticular sheet C will cause great deterioration in image quality. Furthermore, if the slow scan speed of the lenticular recording material F is great or the pitch P of lenticular lenses on the lenticular sheet is small compared to the fast scan speed of the light beam L, scan lines SL might be defined over 2 pitches. To solve this problem, one may calculate the angle of deviation of scan line SL on the basis of the relationship between the slow and fast scan speeds, thereby correcting the fast scan direction, x, of the light beam L by angle α that causes each scan line SL to coincide with the direction of the generatrix of the lenticular sheet C.

Figure 10:
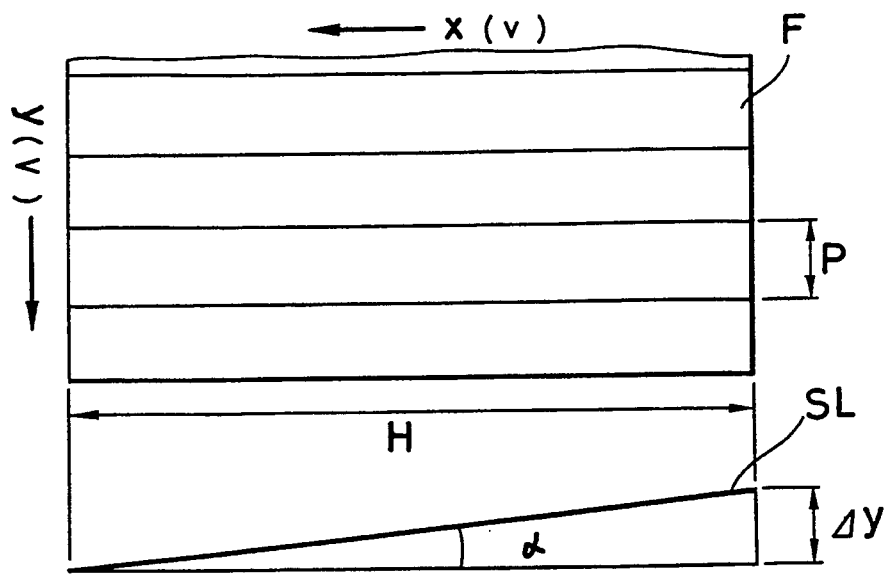
FIG. 10 is a line diagram illustrating the method of correcting a scanning line with respect to the generatrix on the stereoscopic image recording apparatus shown in FIG. 9.

If the lenticular recording material F having width H in the fast scan direction is transported at the slow scan speed V as it is scanned over with the light beam L at the fast scan speed v (see FIG. 10), then the deviation Δy in the slow scan direction between the scan start and end points of light beam L is expressed by:

$$\Delta y = H \times (V/v).$$

Therefore, the angle α formed between the horizontal line and the scan line SL defined by the light beam L is:

$$\alpha = \Delta y / H = V/v.$$

If the fast scan direction x is set with the angle α being taken into account, the scan line SL defined by the light beam L can be brought into substantial agreement with the generatrix of the lenticular sheet C, whereby a satisfactory stereoscopic image can be recorded.

The angular adjustment described above may also be effected by adjusting the angle of the lenticular recording material F.

The method for bringing the scan line SL into agreement with the generatrix of the lenticular sheet C is in no way limited to the method just described above. According to an alternative method, the lenticular recording material F is transported in the slow scan direction with repeated stop and go and its transport and the modulation of light beam L (image recording) are controlled in such a way that image recording with the light beam is effected when the recording material F stops.

For producing a stereoscopic image of high quality using the lenticular sheet C, it is preferred that the recording apparatus of the present invention is equipped with a means of achieving registry in image recording on the lenticular recording material F.

The registration means is not limited in any particular way and may be exemplified with advantage by using various methods including: the optical methods forming a detection means such as sprocket holes or notches in the lenticular recording material F and providing the light-emitting device and the light-receiving device in the corresponding positions of the detection means or the ridges and grooves in the lenticular sheet C so that the recording positions are brought into registry on the basis of the change that occurs in the quantity of detection light emitted by light-emitting device when it passes through said detection means; or detecting the ridges and grooves in the lenticular sheet per se by a mechanical, pneumatic or otherwise technique; or sensing detection means such as sprocket holes or notches by a mechanical method; or detecting the position of the lenticular recording material F by means of encoders or the like that are provided on transport rollers or the like for the recording material and achieving registration of the positions for image recording.

Registration of the image recording positions may be performed only at the time of starting the recording process; alternatively, detection by a suitable method such as light detection may be performed either periodically or continuously and the result of detection is fed back to achieve periodic or continuous registration of the image recording positions.

The recording apparatus 10 and 11 described above are such that they cause the light beam L to be deflected in the fast scan direction as the lenticular recording material F is transported in the slow scan direction, whereby scan exposure is performed on said recording material F to record a stereoscopic image thereon. However, in one of such alternative methods, slow scanning with the light beam L may be accomplished by moving the optics for light beam L in the slow scan direction or by changing the angle of the light deflector or the bend-down mirror in the slow scan direction.

Figure 11:
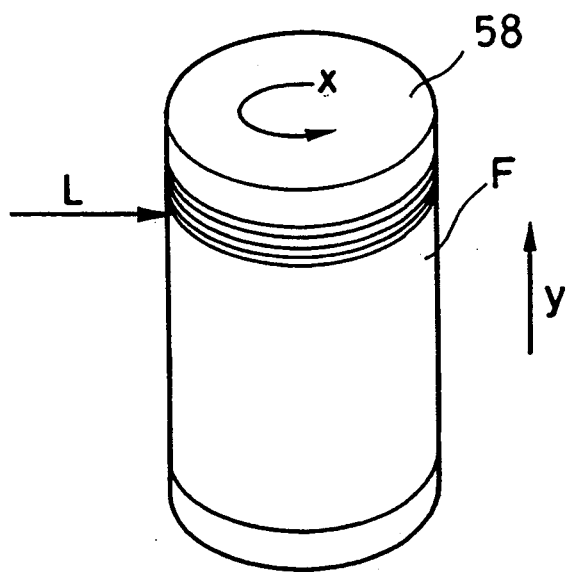
FIG. 11 is a perspective view showing diagrammatically another embodiment of the fast and slow scanning means that can be used in the stereoscopic image recording apparatus of the present invention.

Another scanning means that may be used in the present invention is a "drum scanner" which is described below briefly with reference to FIG. 11; using a cylindrical drum 58 to which the lenticular recording material F is secured, as the light beam L is allowed to be incident in a predetermined exposing position on the drum surface, the drum 58 is rotated in the fast scan direction (indicated by arrow x) while it is moved in the slow scan direction (indicated by arrow y), whereby the lenticular recording material F (on the drum 58) is subjected to both slow and fast scanning so as to perform two-dimensional scanning of the lenticular recording material F.

In this alternative case, too, slow scanning may be accomplished by changing the angle of the light deflector or mirror or by moving the optics.

The foregoing description assumes the use of one or more reading units 18 to read the two original images a and b, followed by line sequential recording of a stereoscopic image (linear images) on the lenticular recording material F. However, this is not the sole case of the present invention and the reading of one or more original images may alternate with the recording of the associated linear image(s) to record a stereoscopic image.

This alternative case may be implemented by the following procedure. First, original image a is read and, after being subjected to the same image processing operations as already described above by the image processing means 12, the image information on the original image a is sent to the image forming means 14. In response to this image information, the linear images into which the original image a has been made are recorded sequentially in the predetermined positions on the lenticular recording material F; in the case shown in FIG. 3, the linear images $a_1, a_2, a_3, a_4, \ldots$ of the original image a are recorded sequentially.

When the recording of the original image a is completed, subsequent original image b is read and recorded sequentially in the same manner as just described above, whereupon the recording of a complete stereoscopic image ends.

The reading of original images may proceed in parallel with the recording of associated linear images. When the reading unit 18 reads original image a for one scan line or one linear image, the image information data are sequentially transferred to the image processing means 12, where they are subjected to same image processing operations, and the processed image information data are transferred sequentially to the image forming means 14. In response to the input image information, the image forming means 14 forms the corresponding linear images ($a_1, a_2, a_3, a_4, \ldots$,) which are recorded as shown in FIG. 3. Thus, in the embodiment under consideration, the recording of linear images of the original image a starts with a delay of one to several scan lines behind the reading of original image a and, thereafter, the two operations are performed in parallel to each other.

In the next place, consider the case of using as many image processing means 12 as the original images (or using a single reading unit 18 in combination with as many linear image processing units 20 as the original images). A plurality of original images are read either simultaneously or sequentially and the respective Original images are processed by separate linear image processing units 20; using a switcher or the like, each linear image processing unit 20 is switched to the image forming means 14 and vice versa per recording of one linear image, so that the information data on the linear images of the respective original images are transferred sequentially (i.e., $a_1, b_1, a_2, b_2, \ldots$) to the image forming means 14, whereby the linear images are recorded on a line sequential basis on the lenticular recording material F.

It should also be noted that the recording apparatus 10 and 11 of the present invention may employ more than one image forming means 14 so that a plurality of linear images are recorded simultaneously. Particularly high efficiency is insured for the recording of stereoscopic image if the image processing means 12 and the image forming means 14 each of which is equal in number to the original images to be recorded and if the reading of all original images is performed simultaneously with the recording of linear images.

Figure 12:
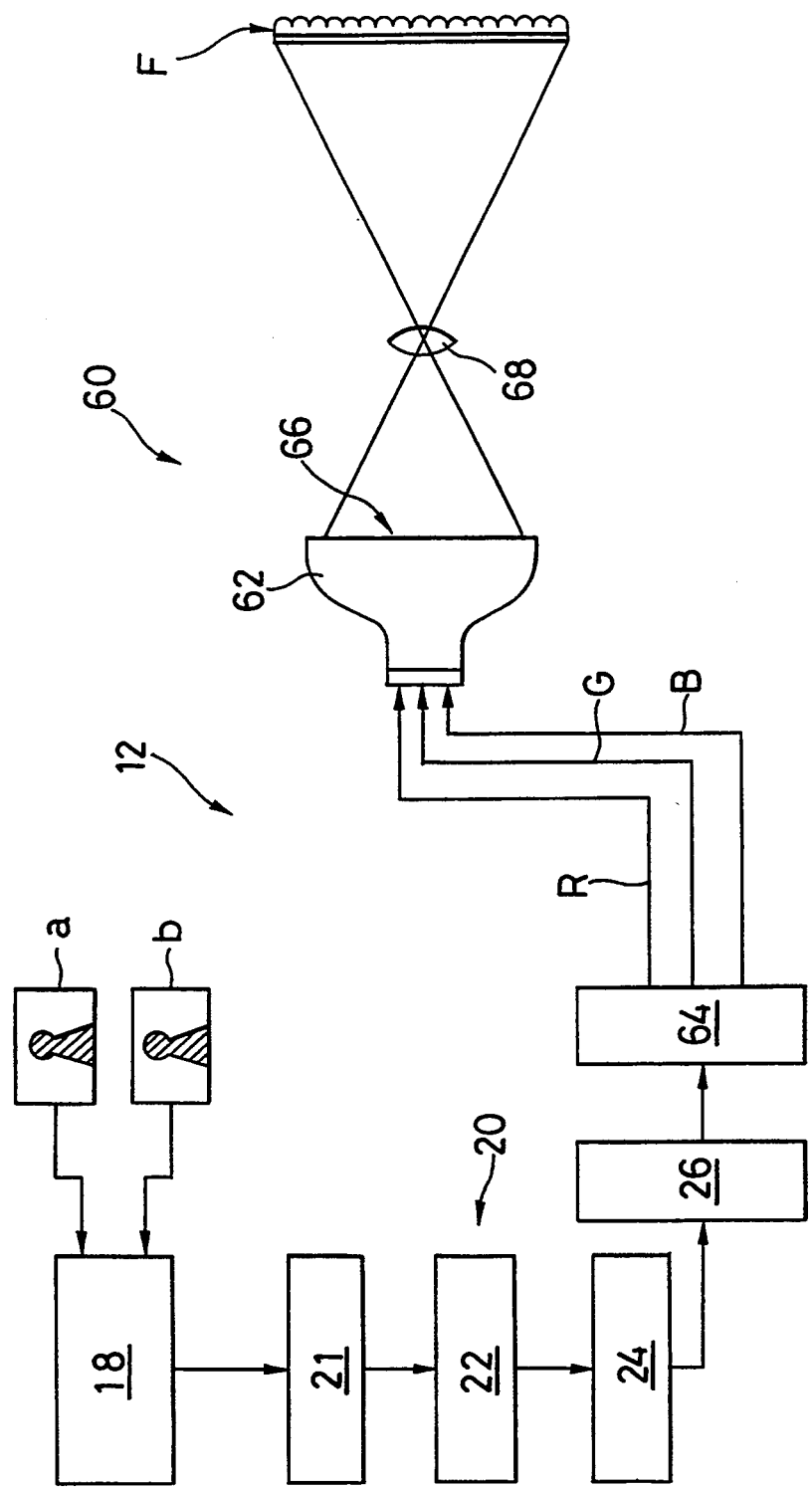
FIG. 12 is a diagram showing conceptually a stereoscopic image recording apparatus according to yet another embodiment of the present invention.

FIG. 12 is a diagram showing schematically an apparatus for recording a stereoscopic image according to another embodiment of the present invention.

The recording apparatus 10 shown in FIG. 1 is such that original images a and b are read photoelectrically and subjected to image processing by the image processing means 12 and the light beam L modulated in accordance with the processed image information is used to expose the lenticular recording material F from the rear side. The recording apparatus generally indicated by 60 in FIG. 12 uses a display as an image forming means and, in response to the linear image information processed by the image processing means 12, the linear images of each original image are represented on a display such as CRT 62 as they are arranged in such a way that they will come out correctly when viewed from the lenticular sheet C side, and the displayed image is recorded on the lenticular recording material F from the rear side.

The recording apparatus 60 shown in FIG. 12 only differs from the recording apparatus 10 in that a display is used as an image forming means and that the image displayed on it is recorded on the rear side of the lenticular recording material F; since the image processing means 12 and other components of the apparatus 60 have the same construction as with the apparatus 10, the components that are the same as those shown in FIG. 1 are identified by like numerals and will not be described in detail.

In the recording apparatus 60, the reading unit 12 outputs information on the linear images of original images a and b as they are arranged in a predetermined order. The information is then sent to a display control circuit 64 and processed as R, G and B signals to be displayed on the CRT 62. The image signals R, G and B are sent to the CRT 62, which displays the corresponding images on the screen 66 by scanning.

The image displayed on the screen 66 is a composite of the linear images of the respective original images that are sequenced in such a way that those linear images which are formed on the lenticular recording material F will come out correctly when they are viewed from the lenticular sheet C side. Hence, the linear images of the respective original images are arranged sequentially in a predetermined order as in the case shown in FIG. 3 (i.e., $a_1, b_1, a_2, b_2, a_3, b_3 \ldots$); in other words, the sequence of linear images is the same as that of the images recorded on the lenticular recording material F in the recording apparatus 10 shown in FIG. 1 (except that the sequence is reversed right and left in a case like the embodiment shown in FIG. 12 where direct recording is made using only one imaging lens 68 which is to be described below).

Moreover, each linear image is displayed on the screen 66 in such a way that each linear image is recorded within the area which is determined in the same manner as described above in accordance with the assumed viewing conditions of the stereoscopic image and the specifications of the lenticular sheet C when each linear image is recorded on the lenticular recording material F.

The image displayed on the CRT 62 is projected through the imaging lens 68 onto the rear side of the lenticular recording material F and focused on the recording layer D, whereby said recording layer D is exposed to have a stereoscopic image recorded on the lenticular recording material F.

The embodiment under consideration has the advantage that if the size of the display such as CRT is increased and if the image displayed on it is reduced for recording on the lenticular recording material F, it is possible to record a stereoscopic image of high quality in high resolution.

The method of exposing the lenticular recording material F is in no way limited to the projection through the imaging lens 68. If desired, the image displayed on CRT 62 may be directly used to expose the lenticular recording material F.

In a preferred embodiment, a means of adjusting the size of displayed image may be provided for the display such as CRT so that it is adaptable to the size of the lenticular recording material F.

With the recording apparatus 60 according to the present invention, it is necessary to perform registration so that the displayed linear images will correspond to the pitch P of the lenticular lenses in the lenticular recording material F. An exemplary method of registration comprises first checking the positions of the displayed images and the lenticular recording material F by the same method as adopted by the registration means described above and then adjusting the positions of the images on the display.

The image forming means is in no way limited to a display such as CRT. A liquid-crystal display (LCD) can also be used and the linear images of individual original images formed on the lenticular recording sheet F may be displayed in sequence on the LCD in such a way that they will come out as the correct stereoscopic image when viewing is done from the lenticular sheet (C) side. Alternatively, a similar image may be projected onto a screen and a picture of the projected image may be taken with a camera or other processing is done to record the intended stereoscopic image (linear images).

In the case of using a CRT, a liquid-crystal display or a screen, the lenticular sheet may be disposed on the faceplate or the the screen to produce the intended stereoscopic image. It should be understood that the term "recording" as used herein also includes the display of linear images on various display devices and screens.

The stereoscopic image recording apparatuses of the present invention which has been described on the foregoing pages is such that the image processing means 12 is positioned side by side the image forming means 14 and other components within the same housing; however, this is not the sole case of the present invention and the image processing means 12 may be placed in a separate housing from the image forming means 14 or, alternatively, the reading unit 18 alone may be placed in a separate housing, so that the image information delivered from the image processing means 12 is stored in a recording medium such as a floppy disk or an optical disk, from which the information on the linear images of original images is supplied to the image forming means.

There is no particular need for the image processing means 12 to contain the reading unit 18 and instead of incorporating the unit, a source of image information such as computer, a recording medium such as floppy disk, a separate reading unit such as scanner, etc. may be used to produce information on the original images.

The lenticular recording material F on which a stereoscopic image bas been recorded in the manner described on the foregoing pages is subsequently developed by a method that suits the specific type of the recording material (light-sensitive layer), thus completing the process of stereoscopic image formation using the lenticular sheet C.

If desired, an anti-halation layer AH may be provided between the recording layer D and the lenticular sheet C but it goes without saying that this anti-halation layer is rendered colorless by development. After the end of image recording and before and/or after subsequent development, a white layer, a protective layer, etc. may be formed, as required, on the rear side of the lenticular recording material F.

While the method and apparatus of the present invention for recording stereoscopic images have been described above in detail, it should of course be understood that the invention is in no way limited to the preferred embodiments set forth hereinabove and that various improvements and alterations can be made without departing from the spirit and scope of the invention.

As described in detail on the foregoing pages, the method and apparatus of the present invention insure that the linear images of individual original images will be located within predetermined areas at the viewing position and, hence, the occurrence of image flickering and multiple image is effectively prevented to permit stereoscopic images of high quality to be recorded in a simple manner.

Furthermore, information on the original images is processed and the light beam modulated in accordance with the processed image information is used to perform direct scanning exposure on the recording layer of the lenticular recording material, thereby recording a stereoscopic image or displaying an image on a suitable display device or screen. Hence, the optics of the apparatus for recording a stereoscopic image according to the present invention features a simple construction. Furthermore, one can alter the distance between linear images to be recorded and even their density as well by electrical processing of image information and a simple adjustment of the optics and it is also easy to alter or adjust the image recording regions, image density, etc. As a result, there is insured great flexibility in adaptation for the adjustment of the number of original images to be recorded, the performance of various image processing operations such as changing the magnification of image to be recorded and correction of shading, alterations in the specifications of the lenticular sheet, and the change in the size of image to be recorded.

What is claimed is:

1. A method for recording stereoscopic images, which comprises the steps of:
    reading a plurality of original images from different viewpoints;
    splitting each of said original images into linear images to be recorded;
    calculating the linear image recording positions of said linear images for each lenticular lens in a lenticular sheet so as to insure that all of the linear images of the nth original image that are to be recorded in association with the respective lenticular lenses will fall within the same area at the intended viewing position; and
    recording said linear images at said linear image recording positions calculated by said calculating step.

2. An apparatus for recording stereoscopic images, with which linear images as produced from a plurality of original images from different viewpoints are recorded to produce a stereoscopic image using a lenticular sheet comprising a sequence of lenticular lenses, comprising:
    a splitting means that is supplied with information on said plurality of original images and which splits each of said original images into linear images to be recorded;
    a means that determines the linear image recording positions by calculating recording positions of said linear images for each lenticular lens so as to insure that all of the linear images of the nth original image will fall within the same area at the intended viewing position; and
    an image forming means that forms said linear images in accordance with the information on the linear image recording positions which have been obtained by said calculating means.

3. An apparatus according to claim 2, wherein the recording width of said linear images is adjusted in such a way that they are recorded, without producing any overlaps or blank portions, between the right and left ends of each of the linear image recording positions as determined by said recording position determining means.

4. An apparatus for recording stereoscopic images, with which linear images as produced from a plurality of original images from different viewpoints are recorded to produce a stereoscopic image using a lenticular sheet comprising a sequence of lenticular lenses, comprising:
    a splitting means that is supplied with information on said plurality of original images and which splits each of said original images into linear images to be recorded;

a means that determines the linear image recording positions by calculating the recording positions of said linear images for each lenticular lens so as to insure that all of the linear images of the nth original image will fall within the same area at the intended viewing position; and an image forming means that forms said linear images in accordance with the information on the linear image recording positions which have been obtained by said calculating means, wherein areas other than said linear image recording positions are painted with a black color.

5. An apparatus for recording stereoscopic images, with which linear images as produced from a plurality of original images from different viewpoints are recorded to produce a stereoscopic image using a lenticular sheet comprising a sequence of lenticular lenses, comprising:

a splitting means that is supplied with information on said plurality of original images and which splits each of said original images into linear images to be recorded:

a means that determines the linear image recording positions by calculating recording positions of said linear images for each lenticular lens that insure that all of the linear images of the nth original image will fall within the same area at the intended viewing position; and an image forming means that forms said linear images in accordance with the information on the linear image recording positions which have been obtained by said calculating means, wherein areas other than said linear image recording positions are painted with a black color, and wherein said image forming means allows a light beam modulated in accordance with the information on said linear images to be incident on the back side of a lenticular recording material having a recording layer provided as an integral part of the back surface of the lenticular sheet, so that said recording layer is scanned two-dimensionally by said light beam to record said linear images on said recording layer through scanning exposure.

6. A method for recording stereoscopic images as claimed in claim 1, wherein said calculating step further comprises:

calculating the linear image recording positions of m original images $a_1$ to $a_m$, respectively corresponding to intended viewing positions $S_1$ to $S_m$, as respective areas $B_1$ through $B_m$ on a recording layer behind said lenticular sheet intersected by straight lines drawn from the outer ends of $S_1$ and $S_m$ and from a plurality of predetermined points between $S_1$ and $S_m$ through the center of curvature of the lenticular lens so as to insure that all of the linear images of each of said m original images that are to be recorded in association with each lenticular lens will fall within the same area at the intended viewing position.

* * * * *